(12) United States Patent
Ritchie

(10) Patent No.: US 7,013,545 B1
(45) Date of Patent: Mar. 21, 2006

(54) COMPACT DUCT CORNER INSTALLATION TOOL

(76) Inventor: Robert J. Ritchie, 329 Old Westford Rd., Chelmsford, MA (US) 01824

( * ) Notice: Subject to any disclaimer, the term of this patent is extended or adjusted under 35 U.S.C. 154(b) by 0 days.

(21) Appl. No.: 10/418,369

(22) Filed: Apr. 18, 2003

(51) Int. Cl.
*B23P 11/00* (2006.01)

(52) U.S. Cl. ............................. 29/243.5; 29/243.523; 29/243.58

(58) Field of Classification Search .............. 29/243.5, 29/237, 243.523, 243.58; 269/43, 8
See application file for complete search history.

(56) References Cited

U.S. PATENT DOCUMENTS

| | | | | |
|---|---|---|---|---|
| 4,276,765 A | * | 7/1981 | Yoneda ........................ | 72/402 |
| 5,253,554 A | * | 10/1993 | Riera et al. .................... | 81/9.3 |
| 6,250,620 B1 | * | 6/2001 | Durfee, Jr. .................... | 269/43 |
| 6,361,034 B1 | * | 3/2002 | Wolfe ............................. | 269/8 |
| 2002/0089109 A1 | * | 7/2002 | Gulmont et al. ............ | 269/266 |

* cited by examiner

*Primary Examiner*—Lee D. Wilson

(74) *Attorney, Agent, or Firm*—Lambert & Associates; Gary P. Lambert; Melissa Patangia

(57) ABSTRACT

A compact handheld tool for installing corner pieces in ductwork is disclosed. The tool has V-shaped jaws that surround a duct corner. A corner piece to be installed on a flange of the duct is placed against a first of the jaws, and a second jaw closes against the a first jaw, pressing the corner piece against the flange. A third jaw engages with an edge of the flange and presses the edge over the corner piece. The tool can install a corner piece in a single operation independent of the orientation of the duct or tool.

12 Claims, 10 Drawing Sheets

COMPACT DUCT CORNER INSTALLATION TOOL

FIELD OF THE INVENTION

The invention relates to a tool, and more particularly to a compact handheld tool, for installing corners in ductwork.

BACKGROUND OF THE INVENTION

Linear duct sections are commonly fabricated with ends having outwardly directed, transverse flanges used for joining adjacent sections. Angled plates, also referred to as corners, can be inserted manually or automatically into the transverse flanges at the corners of the duct sections and then fastened with bolts to join a pair of adjacent sections. Duct construction of this type is disclosed, for example, in U.S. Pat. Nos. 4,466,641 and 4,542,923. Machinery for automatic placement of angled plates into duct flanges is disclosed, for example, in U.S. Pat. No. 5,926,937. This machine is heavy and is configured for placement on a factory floor. U.S. Pat. No. 5,090,101 discloses a handheld tool for installing corners in transverse duct systems. This tool presses each leg of a corner separately into a corresponding flange sections and crimps that section over the corner leg. The operation then has to be repeated for the other leg, so that two crimping operations are required for attaching one corner. In addition, the corners of the two flange sections will have to be squared before the corner is inserted.

While these automatic and/or handheld machines and tools eliminate manual hammering the corner in place, they are still cumbersome to operate and require several operating steps.

It would therefore be desirable to provide a portable corner installation tool that obviates the shortcomings of prior art tools for inserting and crimping of corners.

SUMMARY OF THE INVENTION

A handheld tool is disclosed for installing corners in ductwork. More specifically, a tool for installing a corner in a flange of a sheet metal duct includes a first jaw moveable relative to a second jaw between an open position and a closed position in a first direction; a third jaw moveable relative to the first and second jaw in the first direction; and an actuator operatively connected with the jaws to move the first and second jaws between the open position and the closed position. Actuation of the actuator presses the corner against the flange, and moves the third jaw against an edge of the flange to crimp the edge over the corner.

According to another aspect of the invention, a tool for installing a corner in a flange of a sheet metal duct a corner includes a tool body; an actuator secured to the tool body and including an operating rod having cam surfaces; a V-shaped jaw secured to the tool body and configured to hold the corner; a first moveable V-shaped jaw pivotally mounted on the tool body and including a cam follower engaging with a first cam surface, the first jaw being urged by a movement of the operating rod against the jaw in a first direction, thereby pressing the corner against the flange; and a second moveable V-shaped jaw pivotally mounted on the tool body and including a cam follower engaging with a second cam surface, the second jaw being urged by the movement of the operating rod in the first direction against an edge of the flange and crimping the edge over two legs of the corner.

Embodiments of the invention may include one or more of the following features. The actuator can include an operating rod with cam surfaces, wherein the operating rod can move toward and retract from the jaws in a second direction substantially perpendicular to the first direction. The second jaw can include a cam follower engageable with a first cam surface to move the first and second jaws from the open position to the closed position when the operating rod moves toward the jaws, and the third jaw can include a cam follower engageable with a second cam surface to move the third jaw against the edge of the flange. The slope of the first cam surface can be different from a slope of the second cam surface, so as to time the closing motion of the second jaw against the first jaw in relation to the motion of the third jaw against the edge.

To control the movement of the jaws, the slope of the first cam surface can be discontinuous, with a slope of a first segment of the first cam surface proximate to the jaws being steeper than a slope of the second cam surface, and a slope of the second segment of the first cam surface distal from the jaws being oriented substantially parallel to the second direction. The slope of the second cam surface can also be discontinuous and divided into two segments.

The jaws can be pivotally supported by a support structure attached to or integrally formed with the tool housing. For locating the corner on the jaw, the second jaw can include one or more pins. To prevent the corner from falling out of the tool before and during installation, the first jaw can be configured so as to temporarily hold the corner for placement against the flange, for example, by a magnetic force produced by magnets, which can be electromagnets and/or permanent magnets. Alternatively, vacuum suction, an adhesive or mechanical devices, such a clips, can be used instead of magnets. The third jaw, or crimping jaw, can have sloped surfaces adapted to engage with the edge of the flange. For facilitating alignment of the second jaw relative to the flange, the second jaw can include a stop that engages with the flange, in particular an interior wall of the duct.

Advantageously, the jaws can be V-shaped and configured to simultaneously engage two sides of a flange corner, so as to simultaneously crimp the edges of the two sides of the flange corner over the corner. The angle between the legs of the V-shaped jaws can be adjustable or fixed, for example, approximately 90°.

The tool can be operated by applying to the actuator a hydraulic, pneumatic, mechanical or electromagnetic force.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a tool for installing corners in sheet metal flanges. In particular, the tool described herein is handheld and can install and crimp a corner in a sheet metal flange in a single operational step.

Figure 1:
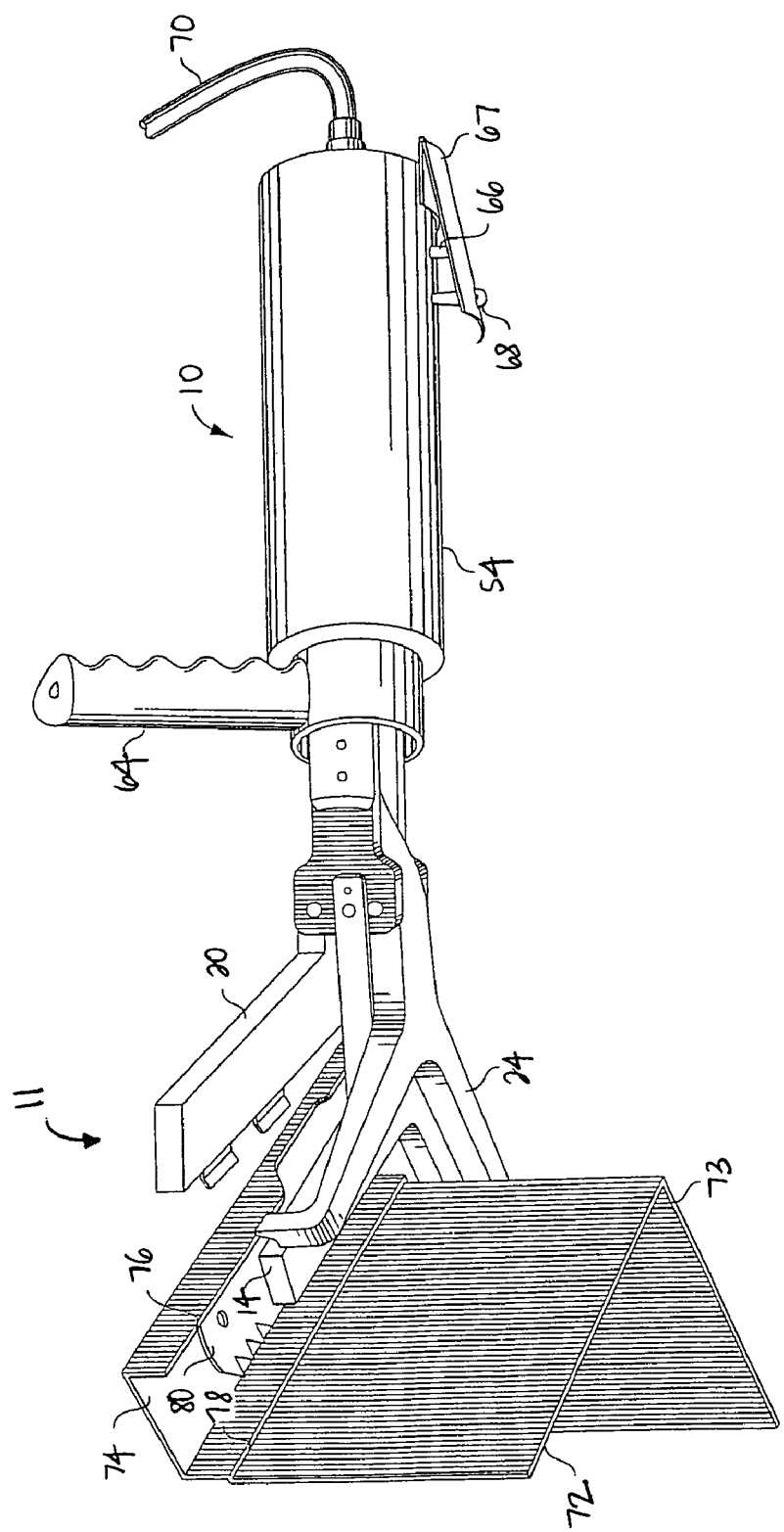
FIG. 1 shows an exemplary embodiment of a tool for installing corners in sheet metal flanges.

Referring now to the drawings, and in particular to FIG. 1, there is shown an exemplary embodiment of a duct corner installation tool 10 which cooperates with a flanged section of a sheet metal duct 72 to insert a corner 80. The tool 10 includes a housing 54 with a handle 64 for holding the tool 10, a power line 70 connected to a power source (not shown) to supply pneumatic, hydraulic or electrical power to the tool, and a switch 66 for controlling power to an actuator 50 (see FIG. 3). The switch 66 can be activated, for example, by pressing down on a lever 67 which can have a safety catch 68 to prevent inadvertent activation of the tool. The safety catch 68 can be released, for example, by rotating the catch.

The tool 10 has a jaw section 11 with jaws 14, 20, 24 which are actuated by the actuator 50 in a manner described below.

The end sections of sheet metal ducts 72 are customarily terminated with a flanged section having an outer rolled edge and an inner lip, which define a flanged channel 74. A corner 80 is placed in the channel 74 around a corner 73 of the sheet metal duct 72. When the tool is actuated, the corner 80 is first urged into the channel 74, whereafter a portion of the outer rolled edge 76, preferably simultaneously of the two outer rolled edges 76 on both sides of the duct corner 73, is pressed over the corner 80 to secure the corner 80 in the flanged channel 74. The V-shaped jaws of the tool 10 enclose an angle that matches the angle of the corner 73 of the sheet metal duct 72, which is typically 90°, although the jaws can be designed for other angles. As mentioned above, the tool 10 can secure both legs of the corner 80 to the flange in a single operating step.

Figure 2:
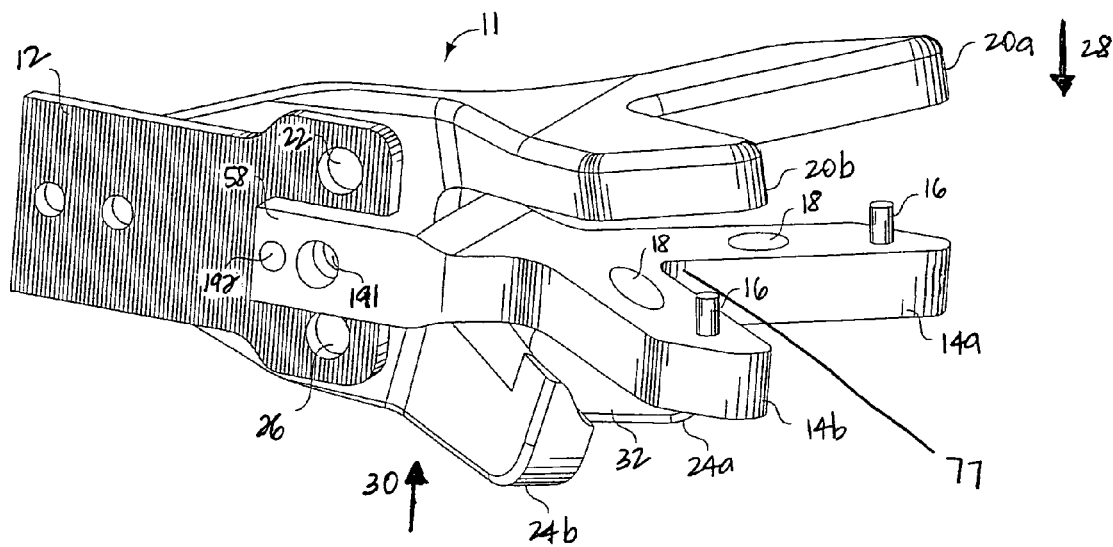
FIG. 2 is a perspective view of the jaw section of the tool in an open position.

FIG. 2 shows in greater detail the jaw section 11 of tool 10. The jaw section 11 includes a support 12 to which a stationary jaw 14 is attached by support pins 191 and 192, which keep the stationary jaw in fixed alignment with the support 12. The jaw 14 can be attached to the support 12 also by other types of fasteners, such as bolts, rivets and the like, or can be materially connected, for example, by welding. Alternatively, the jaw 14 and the support 12 can also be manufactured as one piece. A moveable jaw 20 is pivotally supported in the support 12 for rotation about a pivot axis 22, with the moveable jaw 20 moving relative to the jaw 14 in a direction indicated by arrow 28. A crimping jaw 24 is pivotally supported in the support 12 for rotation about a pivot axis 26, allowing the crimping jaw 24 to move relative to the jaws 14, 20 in a direction indicated by arrow 30, i.e. parallel to the direction 28.

Figure 3:
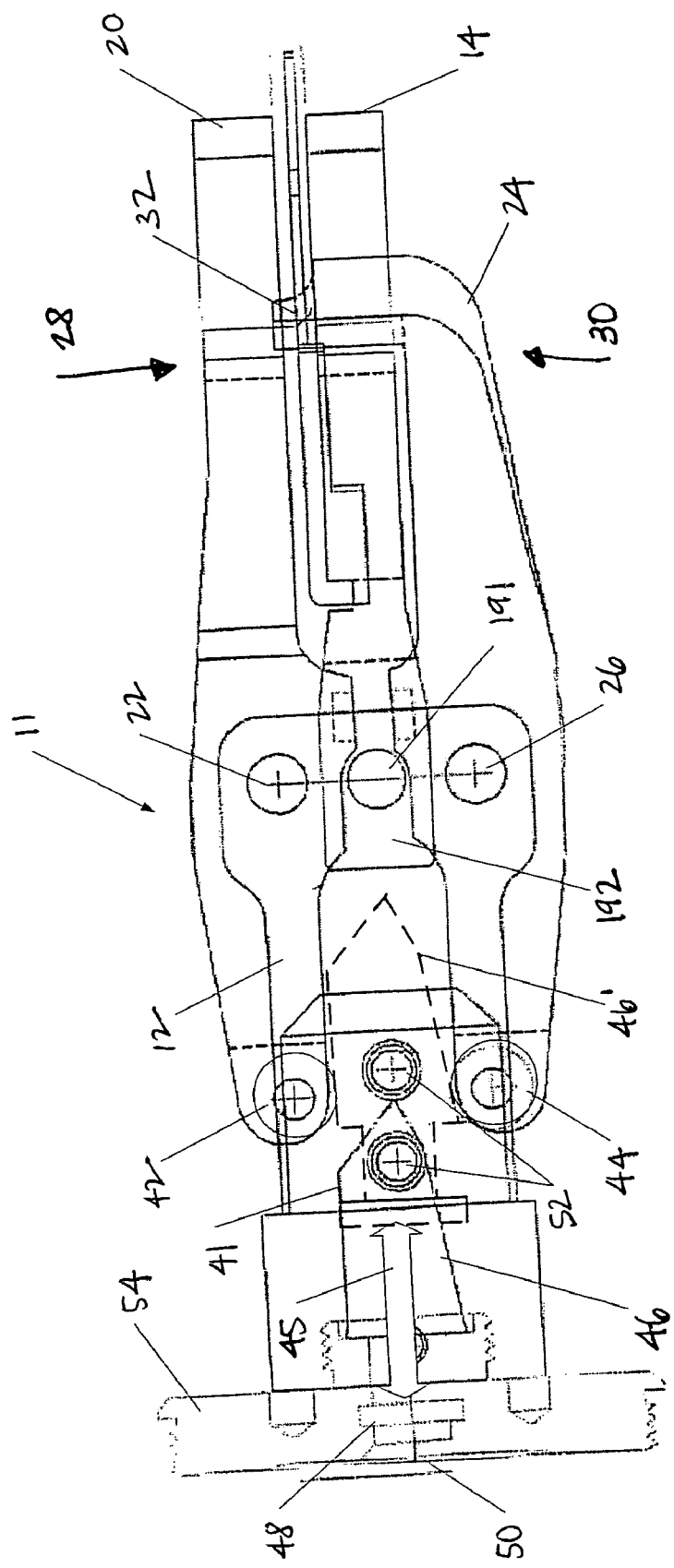
FIG. 3 is a side elevational view of the jaw section of the tool of FIG. 2 in a closed position after crimping.

FIG. 3 is a cross-sectional view of the jaw section 11 of tool 10 to show more clearly an exemplary actuation mechanism that moves the jaws 20, 24 relative to jaw 14. The jaw support 12 can be attached to the housing by various types of fasteners, such as bolts, pins, rivets and the like, or can be produced as a unitary construction. The actuator 50 in this embodiment is operatively connected with an operating rod 48 that can move in a longitudinal direction, as indicated by arrow 45. The direction 45 is substantially perpendicular to the directions 28, 30 in which the jaws 14, 20, 24 move relative to each other. The forward end of the operating rod 48 proximate to the jaws 14, 20, 24 supports a cam 46 having sloped cam surfaces 41, 43 disposed on opposite sides of the cam 46. The cam 46 moves to a second cam position 46', when actuated by the actuator 50, in which cam position 46' the jaws 14, 20, 24 are closed. The actuator 50 (not shown in detail) can be of conventional design and may be driven, for example, pneumatically, hydraulically, mechanically and/or electromagnetically (e.g., linear or rotary electric motor with optional gearing).

Although power-assisted operation can enhance user convenience, it should also be appreciated that a number of techniques are known for converting a manually applied force into operation of a hand tool, and may be adapted to the devices described herein.

As mentioned above, the jaw 20 pivots about pivot axis 22 when moving relative to the stationary jaw 14. The pivot motion of jaw 20 is brought about by a roller cam 42 which rides on a first cam segment of surface 41 having an initially relatively steep angle which transitions to second segment with a shallower angle. This cooperation between cam roller 42 and the cam segments may quickly urge the jaw 20 against the stationary jaw 14 when the operating rod 45 moves toward the jaws and may thereafter maintain the jaws 14, 20 in a closed position.

Likewise, the crimping jaw 24 pivots about pivot axis 26, with the pivot motion of jaw 24 brought about by a roller cam 44 which rides on a second cam segment of surface 43 having an initial slope that is shallower than the steep slope of the first cam segment of surface 41. As seen from FIG. 3, with aforedescribed configuration of cam surfaces, the crimping surfaces 32 of jaw 24 contact the outer rolled edges 76 of the sheet metal flange when the jaws 14, 20 close and them crimp the outer rolled edges 76 over the corner 80 while the jaws 14, 20 remain in the closed position. It will be understood that the moveable jaws 20, 24 can be spring-biased so as to return to their open positions when the actuator is deactivated, i.e. when the operating rod 48 is retracted toward the housing 54.

Figure 2A:
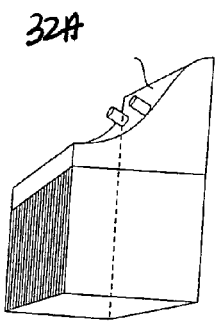
FIG. 2A shows a sloped surface of the crimping jaw with projections.
Figure 2B:
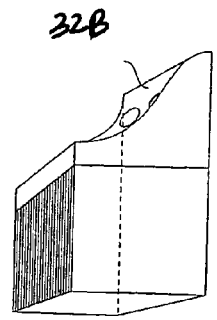
FIG. 2B shows a sloped surface of the crimping jaw with recesses.

As shown in FIGS. 2A and 2B, the crimping surfaces 32 need not be smooth, as indicated in FIG. 2, but can also have one or more projections 32A (FIG. 2A) or recesses 32B (FIG. 2B) formed on or near the sloped crimping surface so as to more firmly hold the corner 80 in the channel 74.

An exemplary corner 80 adapted to be installed with the tool 10 of the invention is disclosed, for example, in U.S. Pat. No. 5,564,758 which is incorporated herein by reference in its entirety. The corner 80 (see FIG. 1) is inserted in the tool 10 and placed against the fixed V-shaped legs 14a, 14b (see FIG. 2) of the jaw 14. The corner 80 can be located on jaw 14 by pins 16 (see FIG. 2) that engage in holes provided in the corner 80. In one exemplary embodiment, permanent magnets 18 (see FIG. 2) are provided on jaw 14 to hold the corner 80 in position, which allows the tool 10 to be operated in any orientation while preventing the corners 80 from falling out. The corners 80 can also be held in place by vacuum suction, an adhesive, and/or mechanical and/or electromagnetic forces instead of permanent magnets 18.

As shown in FIG. 2, the jaws 14, 20 and 24 are V-shaped and have corresponding legs 14a, 14b, 20a, 20b, and 24a, 24b, which may subtend an angle of, for example, 90°. The legs 14a, 14b, 20a, 20b, and 24a, 24b reach around the outside corner 73 of the sheet metal duct 72 and can therefore also square the duct corner 73, thus eliminating additional alignment steps when the corner 80 is inserted in the channel 74 of the duct 72. In one embodiment, the angle subtended by the legs of the jaws 14, 20, 24 is adjustable so that the device can be used with corners 80 and ducts 72 have different interior angles.

Figure 4:
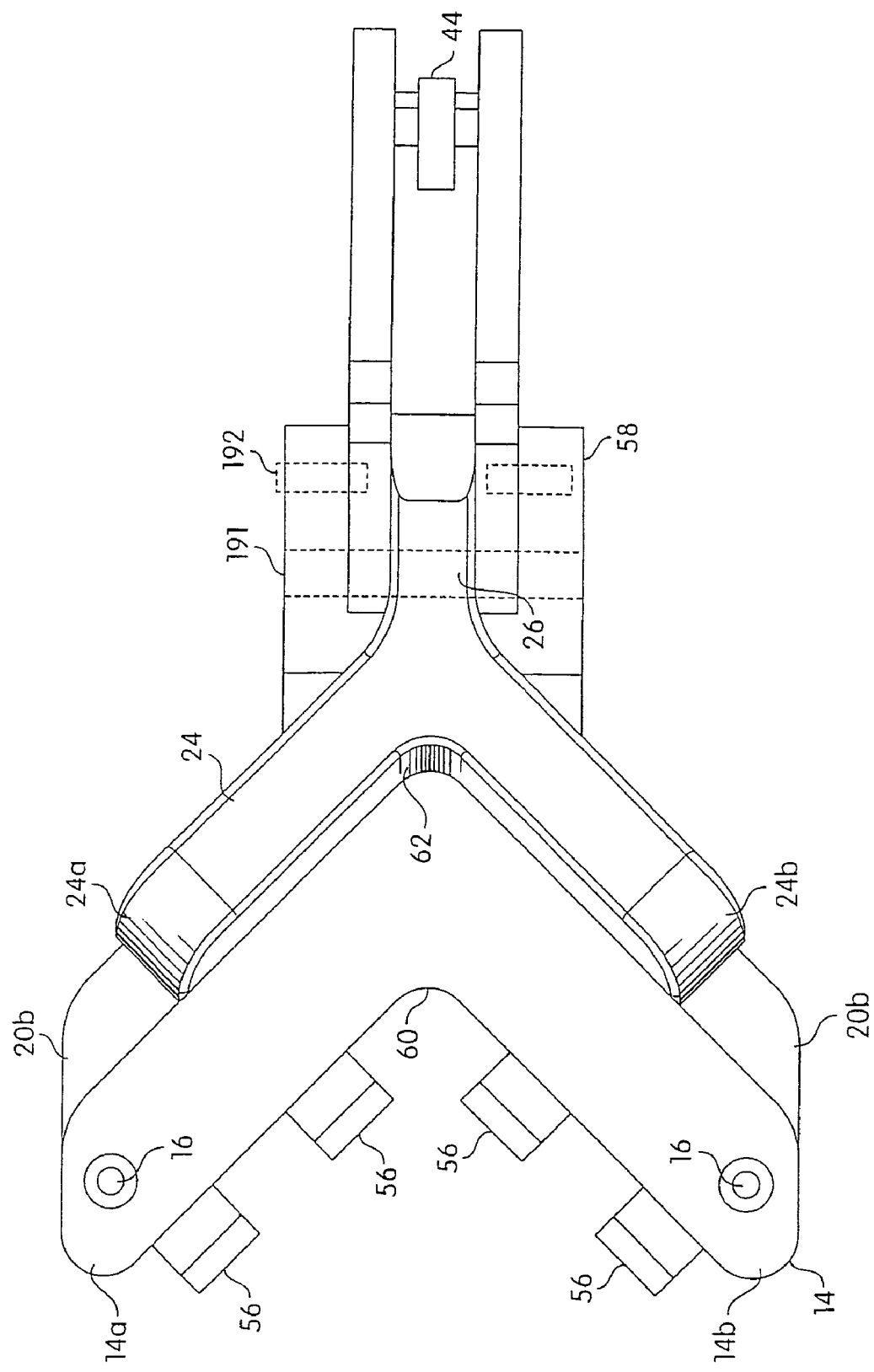
FIG. 4 is a bottom view of the jaw section of FIG. 2.

FIG. 4 is a bottom view of the tool 10 showing more clearly the V-shaped jaws 14, 20, 24 and the respective legs 14a, 14b, 20a, 20b, 24a, 24b. Also shown are optional alignment stops 56 secured to the movable jaw 20 and adapted to engage with interior surfaces, for example, a surface proximate to lip 78, of the sheet metal duct 72. These alignment stops 56 aid with aligning the tool 10 in relation to the duct 72 which further simplifies installation of the corners 80. The alignment stops 56 can be integrally formed with the jaw 20 or fixedly attached to the jaw 20, for example by welding. Alternatively, the alignment stops 56 can also be moveably attached to the jaw 20 to accommodate channels 74 and corners 80 of different sizes.

The tool 10 operates as follows: after a corner 80 is placed on the jaw 14 in the manner described above, the tool 10 is pushed against the corner 73 of the duct 72 and the legs 20a, 20b are brought into contact with the outside face (facing upward in FIG. 1) of channel 74. In this position, the corner 80 is aligned with the channels 74 on both sides of corner 73. Activation of the switch 66 causes the actuator 50 to close the jaws 14 and 20 in the direction of arrow 28, pressing corner 80 into the channel 74.

Thereafter, the crimping jaw 24 moves towards the closed jaws 14 and 20 in the direction of arrow 30. As mentioned above, arrow 30 is essentially parallel to arrow 28. The crimping surface 32 disposed on each leg 24a, 24b of the crimping jaw 24 engages with respective outer rolled edges 76 of the channel 74 of the duct 72, thereby crimping the outer rolled edges 76 over the corner 80. The tool is released by opening jaws 14, 20, 24.

The handheld tool 10 can be conveniently used to secure corners 80 to sheet metal duct 72 at any desired location and operated by one person. The magnets 18 in the jaw 14 prevent the corners from falling out of the tool. When the tool is activated, a piston (for example, with pneumatic or hydraulic actuation, or driven by an electric motor) moves forward and first strikes a roller cam which fully inserts the corner into the duct. The piston continues its forward movement, closing the clamping jaw and the stationary jaw, and then actuates a second roller cam which moves the crimping jaw against the edge of the flange to crimp the edge over the corner.

Figure 5:
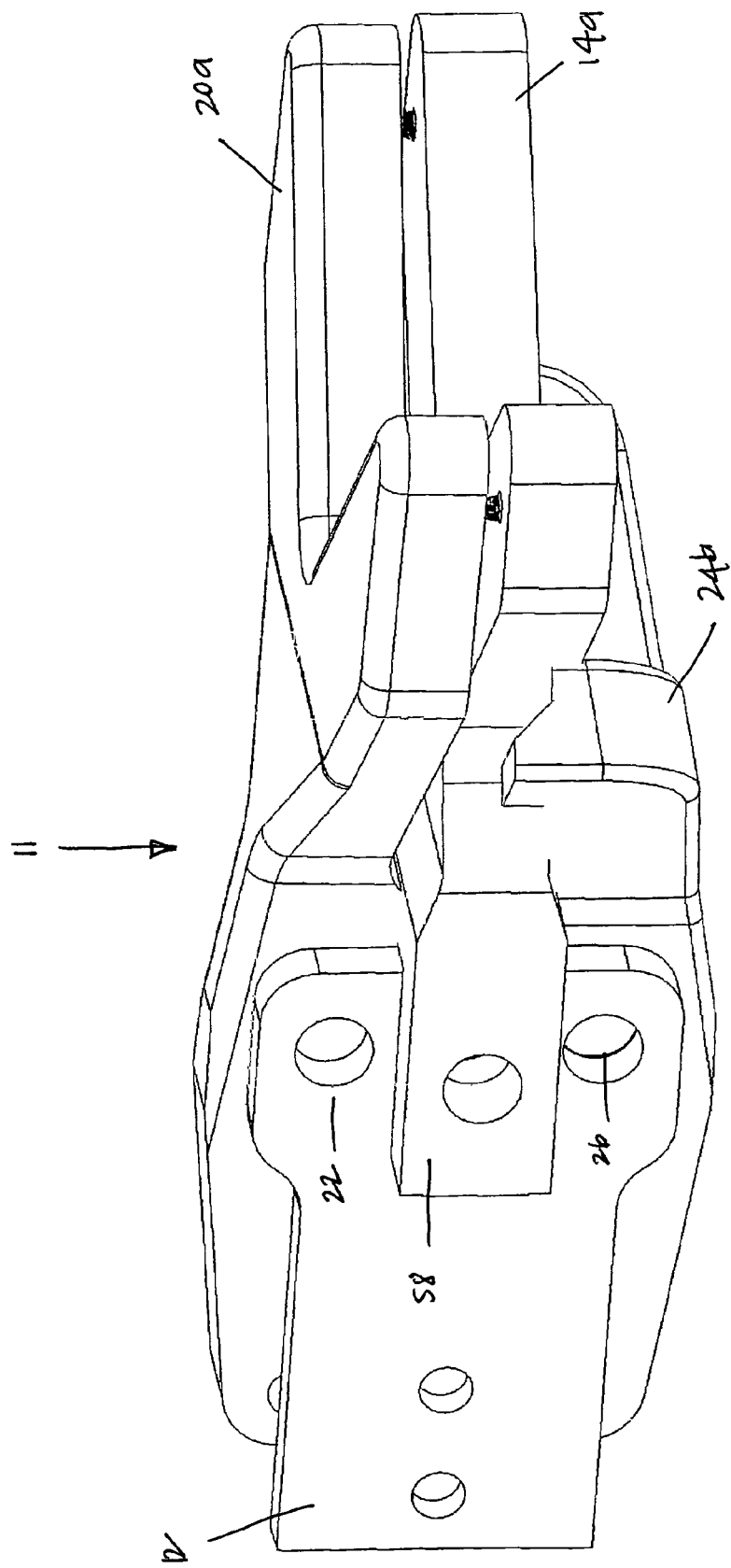
FIG. 5 is a side view of the jaw section of FIG. 2 in the closed position.
Figure 6:
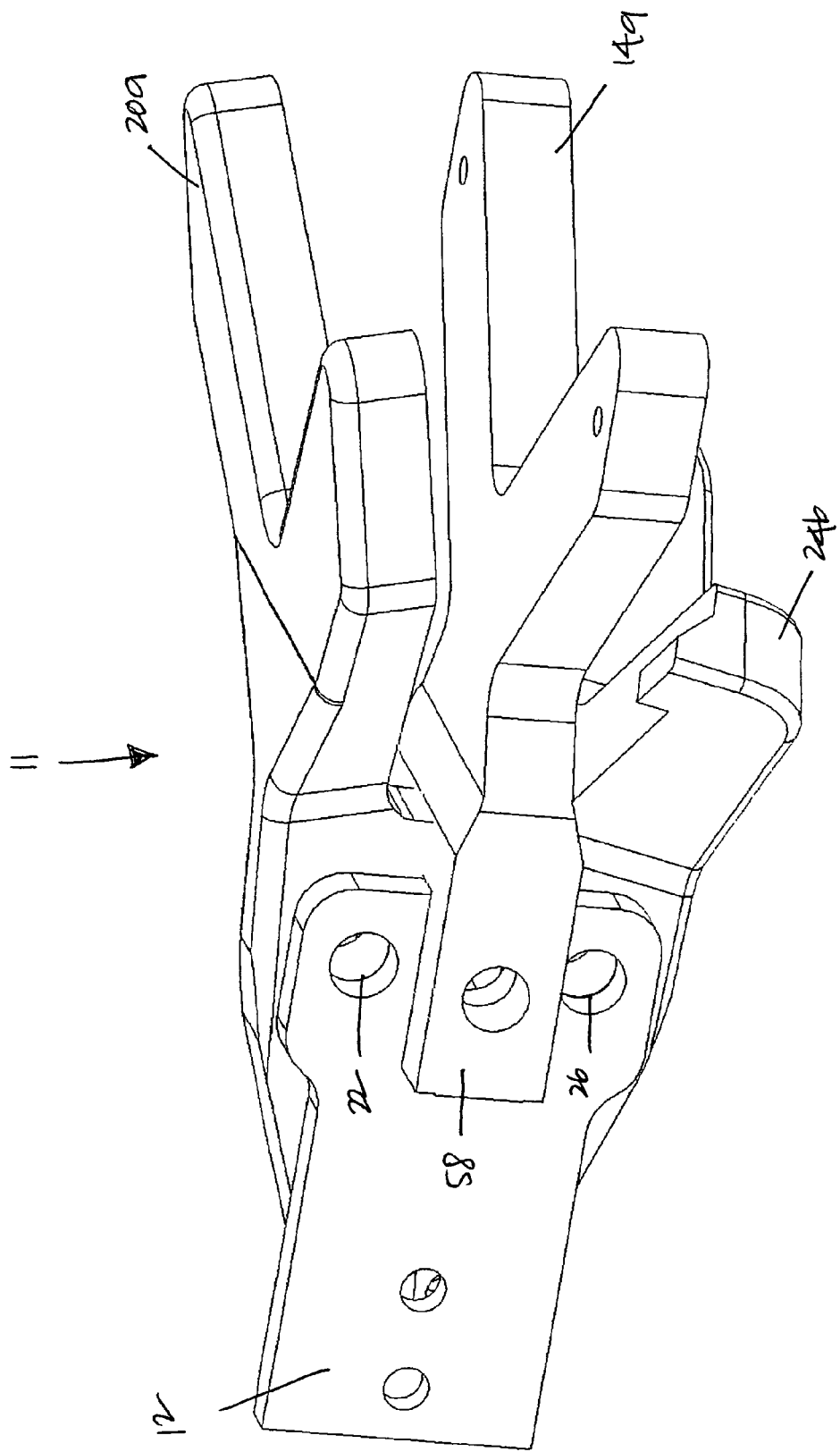
FIG. 6 is a side view of the jaw section of FIG. 2 in the open position.
Figure 7:
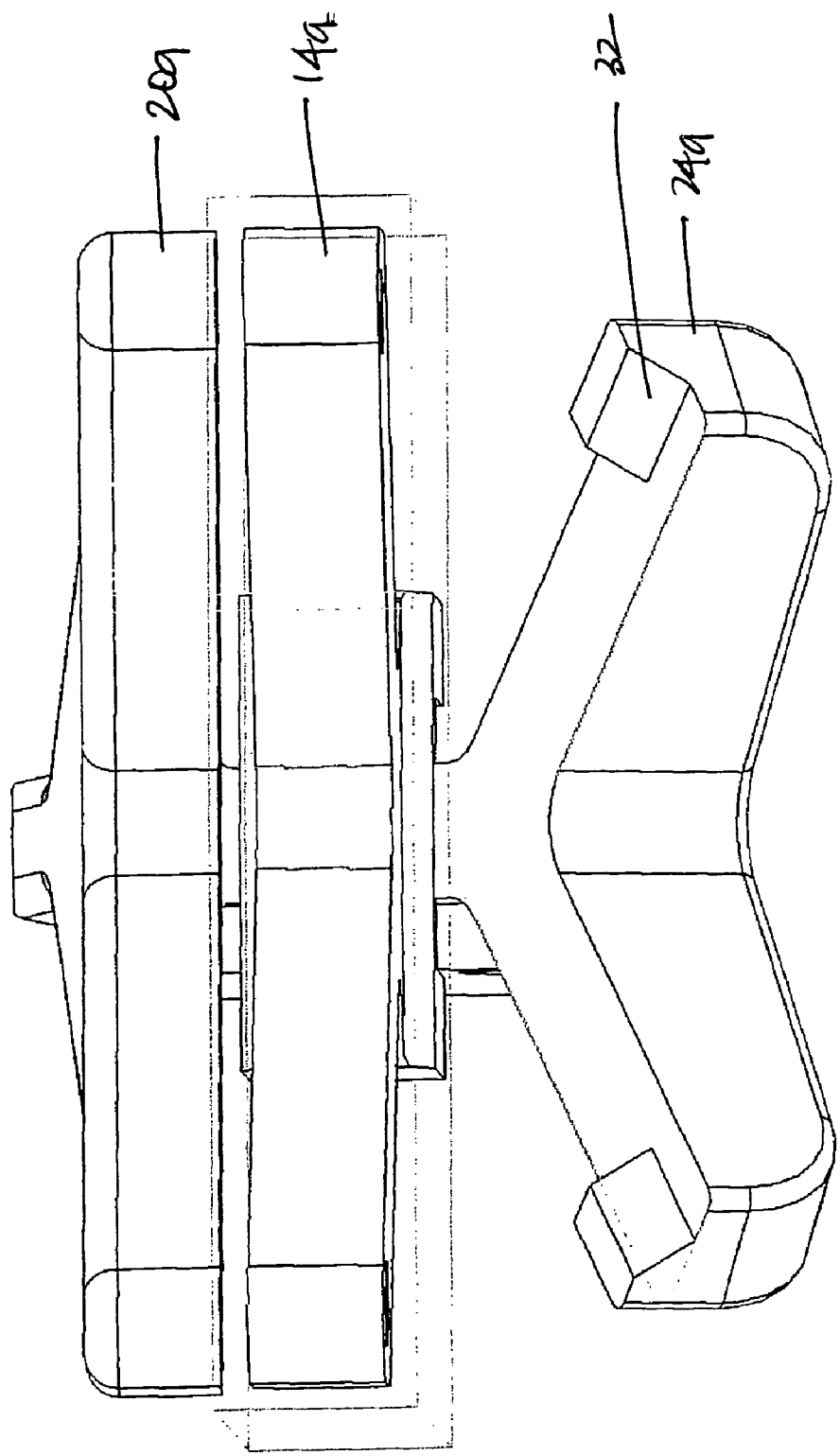
FIG. 7 is a frontal view of the jaw section of FIG. 2 with the top moveable jaw in the closed position and the bottom moveable jaw in the open position.
Figure 8:
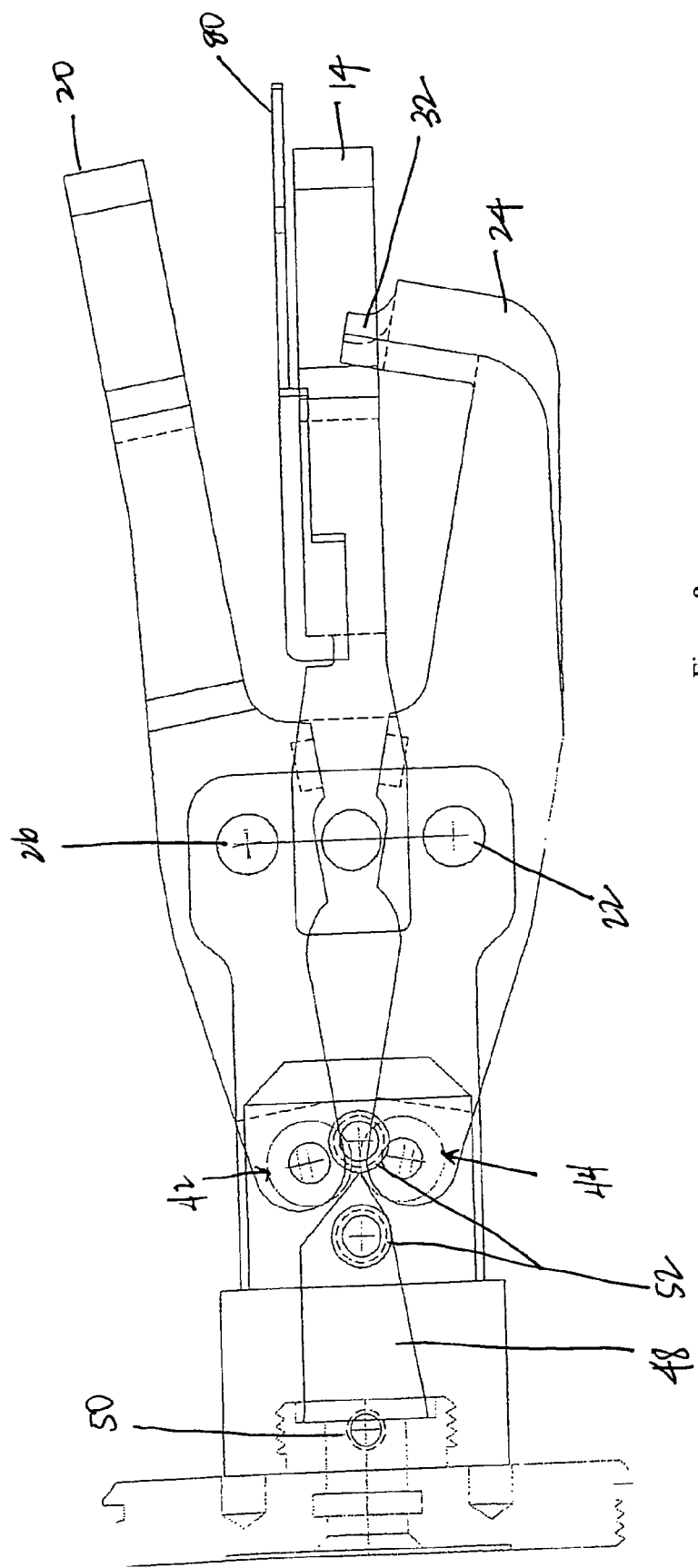
FIG. 8 is a side view of the jaw section of FIG. 2 in the open position with the corner in place.

FIGS. 5, 6, 7, and 8 depict additional view of the jaw section of FIG. 2 for further illustration of the features of the tool. Specifically. FIG. 5 is a view of the jaw section of FIG. 2 in the closed position. FIG. 6 is a side view of the jaw section of FIG. 2 in the open position. FIG. 7 is a frontal view of the jaw section of FIG. 2 with the top moveable jaw in the closed position and the bottom moveable jaw in the open position. FIG. 8 is a side view of the jaw section of FIG. 2 in the open position with the corner in place.

Figure 9A:
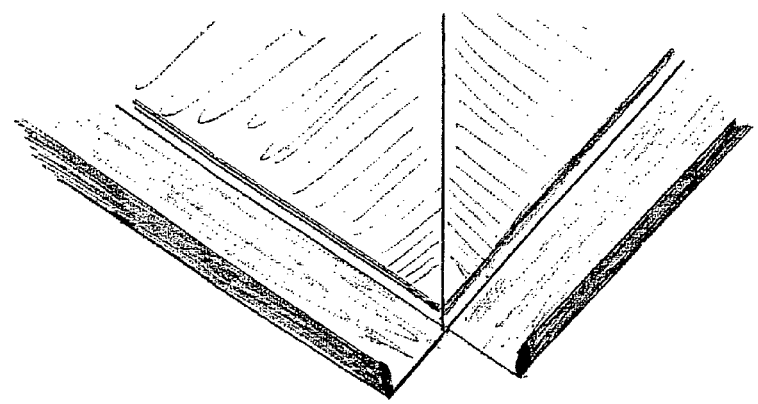
FIG. 9A depicts a raw duct with flanged section.
Figure 9B:
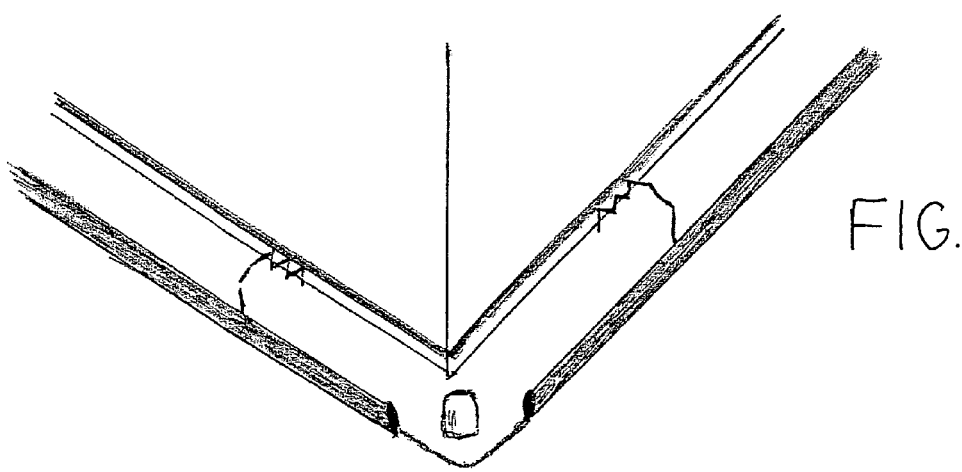
FIG. 9B depicts the corner in place in the flanged section of the duct.
Figure 9C:
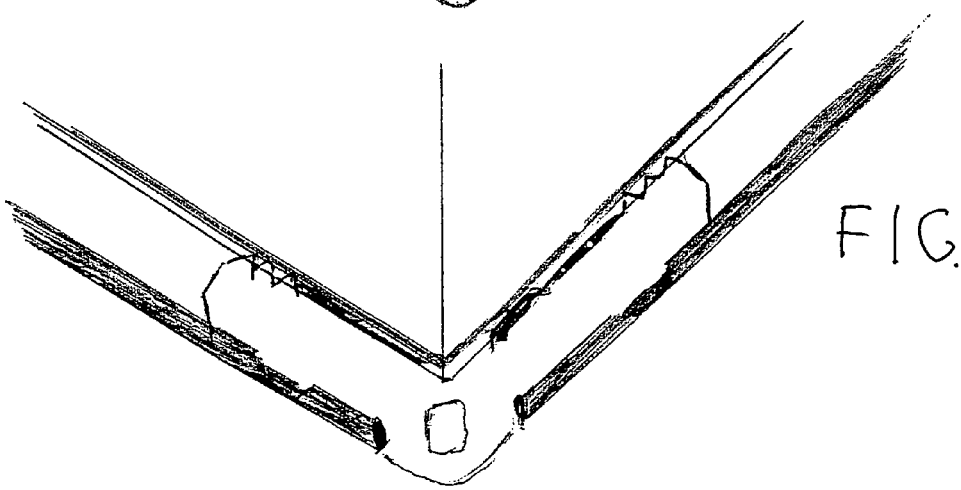
FIG. 9C depicts the corner crimped in place in the flanged section of the duct.
Figure 10A:
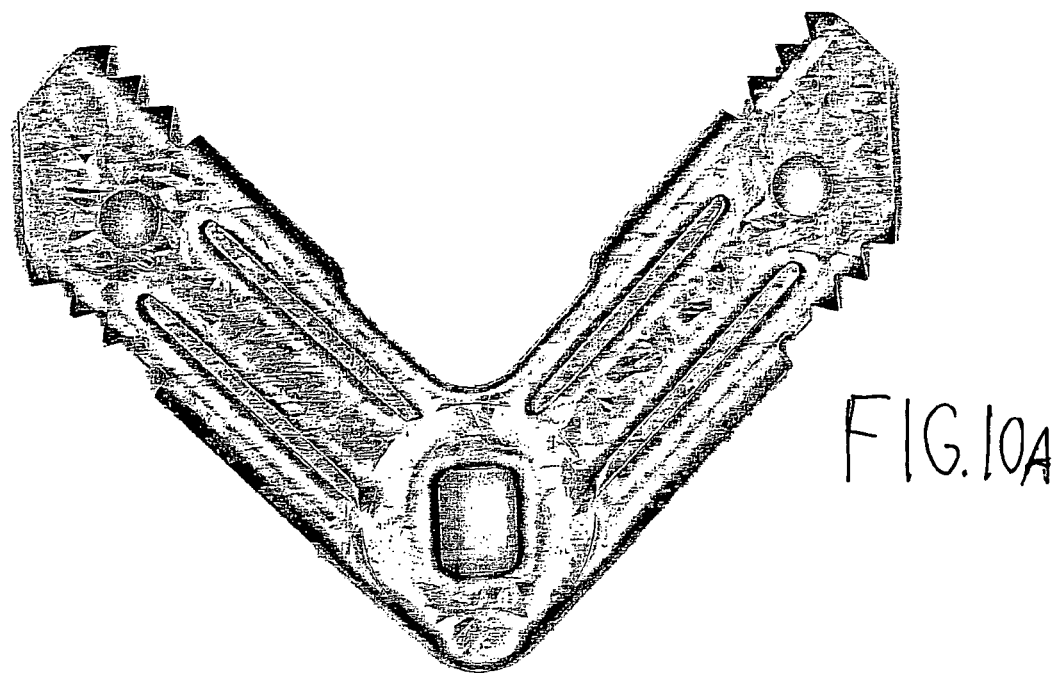
FIG. 10A is a bottom view of the corner.
Figure 10B:
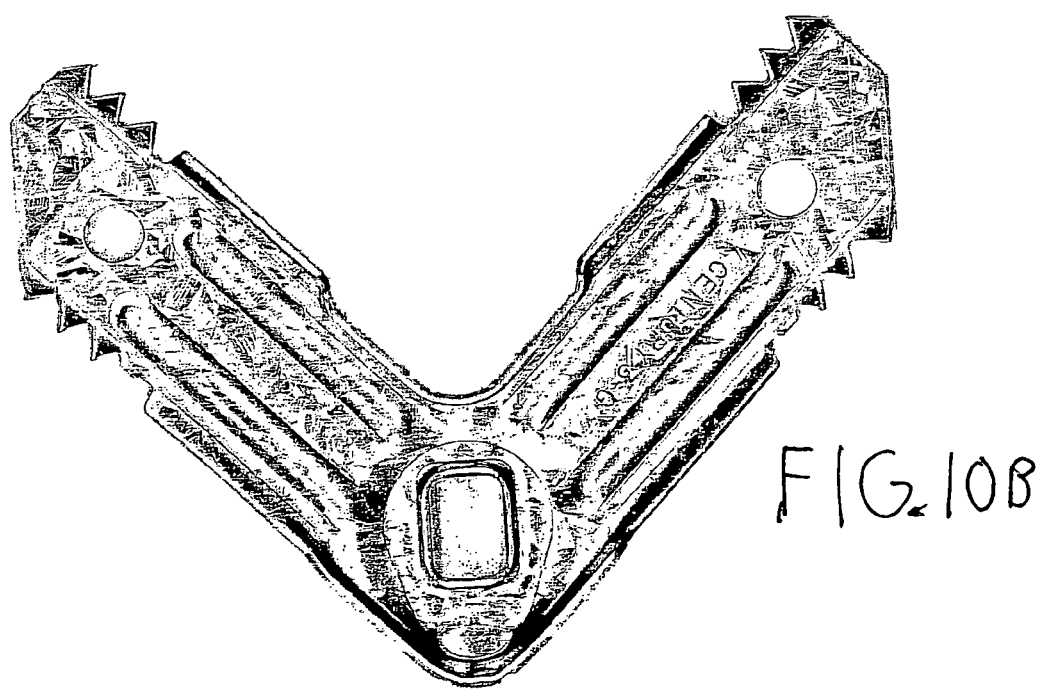
FIG. 10B is a top view of the corner.

FIG. 9A depicts a raw duct with flanged section. FIG. 9B depicts the corner in place in the flanged section of the duct. FIG. 9C depicts the corner crimped in place in the flanged section of the duct. FIG. 10A is a bottom view of the corner. FIG. 10B is a top view of the corner.

While the invention has been disclosed in connection with the preferred embodiments shown and described in detail, various modifications and improvements thereon will become readily apparent to those skilled in the art. For example, the duct can be made of other materials besides sheet metal, such as plastic. Any of the jaws can be configured to be stationary or moveable relative to the housing and/or another jaw as long as the clamping and crimping actions can be performed substantially as described. The multiple jaw operations may also be controlled by a number of pistons or other actuators under the control of a mechanical or electronic timing device, such as a microcontroller. The term "actuator" as used herein is intended to include all such devices and combinations. Moreover, an articulated lever arrangement connected between an actuator and the jaws may be used instead of the cam surfaces and the cam follower to effect the multiple jaw operations. Accordingly, the spirit and scope of the present invention is to be limited only by the following claims.

What is claimed is:

1. A tool for installing a corner into a flanged channel of a sheet metal duct, comprising:
    a first jaw moveable relative to a second jaw between an open position and a closed position in a first direction,
    a third jaw moveable relative to the first and second jaw in the first direction,
    an actuator operatively connected with the jaws to move the first and second jaws between the open position and the closed position, thereby pressing the corner against the flanged channel of the sheet metal duct, and to move the third jaw against an outer rolled edge of the flanged channel of the sheet metal duct to crimp the outer rolled edge over the corner, wherein the actuator comprises an operating rod having cam surfaces, with the operating rod moveable toward and retracting from the jaws in a second direction substantially perpendicular to the first direction, wherein the second jaw includes a cam follower engageable with a first cam surface to move the first jaws from the open position to the closed position when the operating rod moves toward the jaw, and the third jaw includes a cam follower engageable with a second cam surface to move the third jaw against the outer rolled edge of the flanged channel of the sheet metal duct.

2. The tool of claim 1, wherein a slope of the first cam surface is different from a slope of the second cam surface.

3. The tool of claim 2, wherein the slope of the first cam surface is discontinuous, with a slope of a first segment of the first cam surface proximate to the jaws being steeper than a slope of the second cam surface, and a slope of the second segment of the first cam surface distal from the jaws being oriented substantially parallel to the second direction.

4. The tool of claim 2, wherein the slope of the second cam surface is discontinuous with two segments.

5. The tool of claim 1, and further including a jaw support that supports the jaws, with at least two of the jaws being supported in the jaw support for pivotal motion.

6. The tool of claim 1, wherein the second jaw includes vacuum suction for urging the corner against the second jaw.

7. A tool for installing a corner into a flanged channel of a sheet metal duct corner, comprising:
- a tool body,
- an actuator secured to the tool body and including an operating rod having cam surfaces,
- a V-shaped jaw secured to the tool body and configured to hold the corner,
- a first moveable V-shaped jaw pivotally mounted on the tool body and including a cam follower engaging with a first cam surface, said first jaw being urged by a movement of the operating rod against the jaw in a first direction, thereby pressing the corner against the flanged channel of the sheet metal duct, and
- a second moveable V-shaped jaw pivotally mounted on the tool body and including a cam follower engaging with a second cam surface, said second jaw being urged by the movement of the operating rod in the first direction against an outer rolled edge of the flanged channel of the sheet metal duct and simultaneously crimping the edge over two legs of the corner.

8. The tool of claim 7, wherein the operating rod moves in a second direction substantially perpendicular to the first direction and the V-shaped jaw includes legs that are located in a plane which is substantially parallel to the second direction.

9. The tool of claim 7, wherein the corner is urged against the jaw by magnetic force.

10. The tool of claim 7, wherein the jaw comprises a magnet producing a magnetic force that holds the corner on a surface of the jaw facing the first jaw.

11. The tool of claim 7, wherein the jaw comprises a pin that locates the corner on a surface of the jaw facing the first jaw.

12. The tool of claim 7, wherein the second jaw includes legs having a sloped crimping surfaces that engages with outer rolled edges of the sheet metal duct.

* * * * *